United States Patent [19]
Clevenger et al.

[11] 3,710,968
[45] Jan. 16, 1973

[54] BUCKET LEVEL INDICATOR
[75] Inventors: James T. Clevenger, Lancaster; John L. Stohler, Ephrata, both of Pa.
[73] Assignee: Sperry Rand Corporation, New Holland, Pa.
[22] Filed: Sept. 30, 1971
[21] Appl. No.: 185,027

[52] U.S. Cl. ............................................. 214/761
[51] Int. Cl. ............................................. E02f 3/00
[58] Field of Search ............... 214/761, 762, 763, 764

[56] References Cited

UNITED STATES PATENTS

| | | | |
|---|---|---|---|
| 3,275,174 | 9/1966 | Konefes | 214/761 |
| 3,347,398 | 10/1967 | Smith | 214/761 |

Primary Examiner—Albert J. Makay
Assistant Examiner—John Mannix
Attorney—John C. Thompson, Joseph A. Brown and James J. Kennedy

[57] ABSTRACT

A bucket level indicator employed within a front end loader for relating to an operator the relative angular position of a bucket pivotally mounted forwardly within a boom structure carried by said loader. The bucket level indicator of the present invention is comprised of an indicator moveably mounted for lateral back and forth movement along a transverse member extending between a pair of boom arms of the boom structure. A tension spring is fixed to said indicator for normally biasing same towards one side of said transverse member and a cable moveably responsive to the pivotal movement of said bucket is also fixed to said indicator. Thus, the spring and cable cooperatively coact to articulate the indicator laterally back and forth along said transverse member such that the relative position of the indicator with respect to the transverse member indicates to the operator the relative angular position of the front mounted bucket.

11 Claims, 4 Drawing Figures

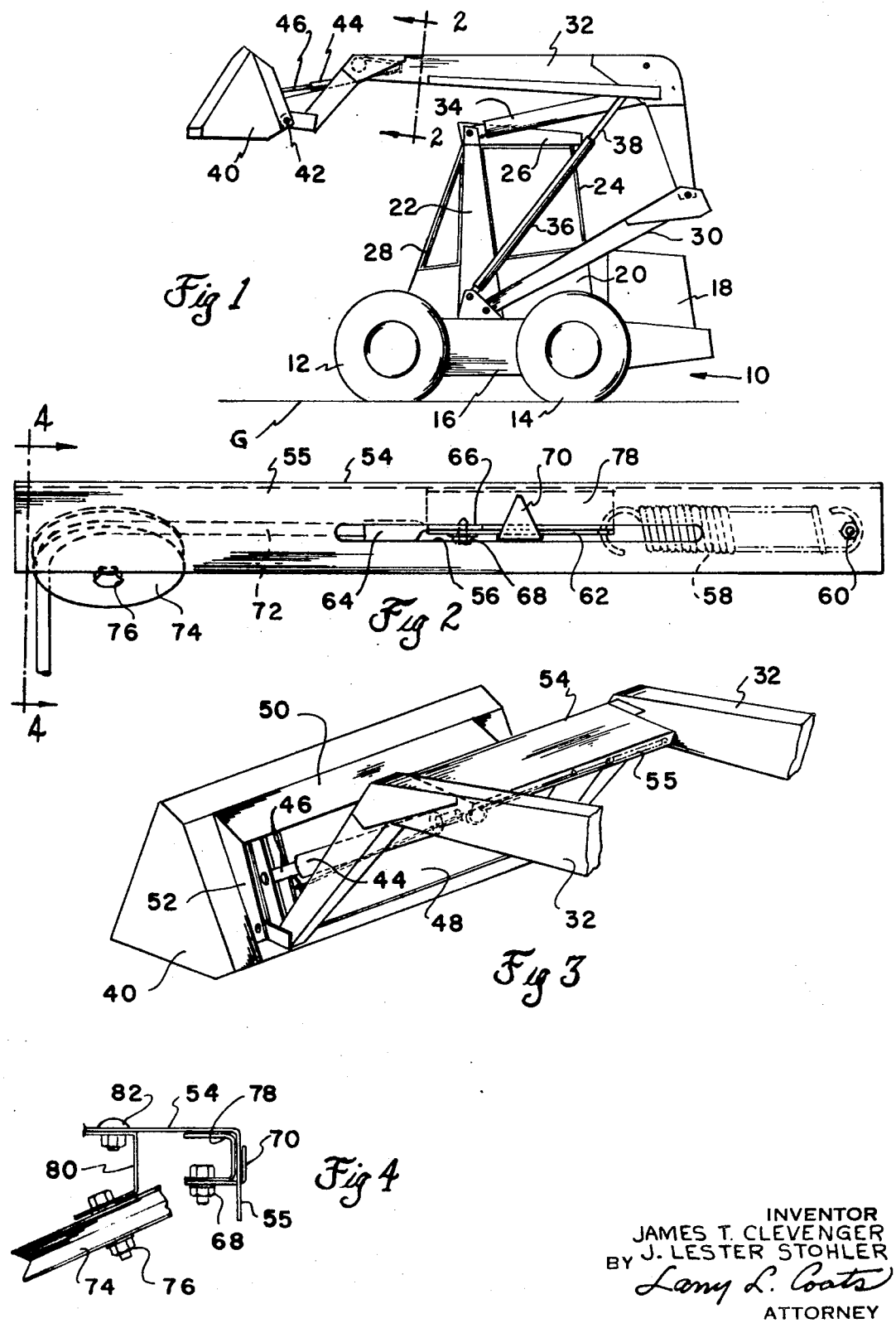

3,710,968

BUCKET LEVEL INDICATOR

BACKGROUND OF THE INVENTION

Inherent in the design of most loaders, if not all, is the inability of the operator to clearly see and accurately determine the angular position of a front mounted bucket. This inability largely stems from the obstruction of the boom lift linkage that extends generally forward from the operator's station. It will be observed that the obstruction is especially pronounced when the boom structure and associated bucket are lowered near the ground level. Individuals in the past have recognized this problem and have attempted to remedy it by providing a bucket level indicator mechanism for appraising the operator of the angular position of the front mounted bucket. In the way of a general review of these prior art techniques, one is directed to the disclosures found in U.S. Pat. No. 3,251,493 to M. A. Popelier and U. S. Pat. No. 3,275,174 to Konefes. Briefly reviewing this prior art, it is noted that in Popelier the bucket level indicator is generally disposed downwardly and to one side of the operator's station. Particularly, the Popelier reference shows a cam type bucket level indicator that is directly actuated off of a hydraulic cylinder that pivots the bucket about a transverse axis mounted forwardly within the boom structure. It is noted that as the cams move back and forth with the hydraulic ram, they move between a pair of pivotally mounted indicators, the relative position of each indicator with respect to the other appraising the operator of the angular position of the front mounted bucket. With reference to the Konefes's disclosure, it is noted that the bucket level indicator shown therein is of the rotary type and includes an indicator thereon for relating to the operator the relative position of the front pivotally mounted bucket. Probably the most significant disadvantage of the prior art, as represented by Popelier and Konefes, lies in the difficulties in interpretating the indicators, and in the relative disposition of these indicators in a location that is not readily convenient to the operator's vision.

SUMMARY OF THE INVENTION

Applicants have devised a bucket level indicator for a front end loader that clearly appraises the operator of the relative angular position of the front pivotally mounted bucket and is disposed in close relationship to the operator's station, almost in face to face relationship to an operator stationed therein. In particular, applicants have provided an indicator moveably mounted about the rear face of a transverse support member, the transverse support member being mounted between a pair of laterally spaced boom arms and particularly spaced to pass in front of the operator's station as the boom arms are moved up and down between upper and lower positions. A spring is anchored to one side of said transverse member and connected to said indicator for biasing the same towards one side thereof. A cable operatively responsive to the pivoting movement of the front mounted bucket is also connected to the indicator and the cable and spring cooperatively coact to pull the indicator laterally back and forth along the transverse member.

It is therefore the principle object of the present invention to provide a bucket position indicator for a front end loader that clearly appraises an operator of the angular position of the bucket and is particularly disposed in close proximity to the operator for convenient viewing thereof.

Another object of the present invention is to provide a bucket level indicator of the particular type that oscillates back and forth about an elongated indicating strip, thereby providing a simple and easy to read mechanism for appraising the operator of the relative angular position of the bucket.

More particular, an object of the present invention is to provide a bucket position indicator adjacent an elongated transversely extending support member that is mounted between a pair of generally forwardly extending boom arms carried by a loader, the transverse support member being particularly spaced within said boom arms so as to pass directly in front of the operator's station formed within said loader as the boom arms are articulated up and down during the operation of the loader.

Another object of the present invention resides in the provision of an L-shaped transverse member that is particularly disposed such that one side thereof generally faces towards an operator's station formed in said loader and wherein said indicator is disposed along the same side facing the operator and is guided laterally back and forth thereacross by a generally U-shaped guide disposed behind said rearward facing side.

A further object of the present invention resides in the provision of a bucket level indicator within the boom structure of a loader in which the boom structure includes a front mounting plate that is adapted to receive numerous types of front attaching material handling implements, and wherein said bucket position indicator is operatively responsive to the movement of said front mounting plate for indicating the relative angular position of the particular attachment adapted to said front mounting plate.

Other objects and advantages of the present invention will become apparent from a study of the following description and the accompanying drawings which are merely illustrative of the present invention.

BRIEF DESCRIPTION OF THE DRAWINGS

FIG. 1 is a side elevational view of a loader having a bucket level indicator incorporated therein drawn in accordance with the present invention.

FIG. 2 is a view taken through the line 2—2 of FIG. 1.

FIG. 3 is a fragmentary perspective view showing the relative disposition of the bucket level indicator of the present invention relative to the loader's boom structure and front mounted bucket.

FIG. 4 is a view taken along the line 4—4 of FIG. 2.

DESCRIPTION OF THE PREFERRED EMBODIMENT

With reference to the drawings, particularly FIG. 1, a front end loader, of the industrial type, is shown therein and indicated by the numeral 10 generally. The loader 10 is basically comprised of a chassis structure 16 having front and rear rotatively mounted wheels 12,14 respectively. Disposed above the chassis structure 16 is a main body structure including a rear engine compartment 18 and a pair of generally vertically extending laterally spaced side walls 20. Extending upwardly adjacent the side walls 20 are a pair of forward support posts 22, and in like manner a pair of rear support posts 24 also extend upwardly from the side walls. The upper portions of the upper posts 22 and rear posts 24 are joined by a roof 26. Disposed forwardly of each of the forward support posts 22 are a pair of generally A-frame panel structures 28.

The loader 10 carries a boom structure that is generally comprised of a pair of lower boom arms 30, the lower boom arms being pivotally connected to a mounting structure disposed just above the chassis structure 16 and extending generally rearwardly and upwardly therefrom, as shown in FIG. 1. Pivotally mounted to the other end of the lower boom arms 30 are a pair of upper boom arms 32 which are of a general L-shaped and extend a short distance upwardly from the lower boom arms and then curved to extend forwardly therefrom. As seen in FIG. 3, the upper boom arms 32 are laterally spaced apart and disposed in general parallel relationship such that as the boom arms are articulated up and down they pass along the outside areas of the loader's main body structure. For guiding the boom arms 32 as they are articulated by the lower boom arms 30, a pair of laterally spaced guide links 34 are pivotally connected to the front portions of the cab and extend generally rearwardly therefrom where the other ends pivotally connect to an intermediate portion of the upper boom arms 32. As previously pointed out, the boom arms 30,32 are articulated up and down along the sides of the main body structure of the loader, and to accomplish this a pair of hydraulic cylinders 36 are provided on each side of the loader's main body in boom structure. In particular, the hydraulic cylinders 36 include a rod portion 38 that is pivotally connected to an intermediate portion of the upper boom arms 32 about the rear thereof. The cylinders 36 are pivotally anchored to the same mounting bracket that pivotally mounts the lower boom arm 30 to the main body structure of the loader, as shown in FIG. 1. A more detailed appreciation and understanding of the linkage structure shown herein may be gained from a study of U. S. Pat. No. 3,215,292 to L. M. Halls, assigned to the present assignee, New Holland Division of Sperry Rand Corporation.

Pivotally mounted about a front portion of the upper boom arms 32 is a mounting plate 48, the mounting plate being pivotally connected about transverse axis 42. The mounting plate 48 is particularly adapted to receive numerous types of front mounted material handling implements and in the present case the plate is connected to a bucket, indicated by numeral 40. The bucket includes an upper transverse mounting lip 50, as best seen in FIG. 3, which receives the upper edge of the attaching plate 48. Although not particularly shown, attaching brackets are fixed to the bucket 40 and extend through the mounting plate 48 where a wedging mechanism actuated by an overcenter linkage is employed to hold the bucket in a tight adjacent relationship to the mounting plate. A complete disclosure of this mounting linkage is set forth in a previously filed U. S. Pat. application entitled "Quick-Attaching Mechanism".

Returning to the present disclosure, a pair of hydraulic cylinders 44 (only one of which is shown) having forwardly extending rods are interconnected between the upper boom arms and the mounting plate 48. The hydraulic cylinders 44 are preferably remotely controlled from the operator's station and when actuated pivot the mounting plate 48, and consequently the bucket 40, about transverse axis 42.

Intermediately disposed within the upper boom arms 32 is a transversely extending L-shaped support member 54. It will be observed that the transverse support member 54 is particularly spaced to pass directly in front of the operator's station formed within the loader 10. It is also noted that the L-shaped support member 54 includes a rearward facing side 55. This rearward facing side 55 includes an elongated slot 56 formed therein (FIG. 2). Anchored by a bolt and nut assembly 60 behind side 55 of a transverse member 54 is a tension spring 58, the tension spring 58 being connected to a first mounting element 62. In turn the first mounting element 62 is connected to a second mounting element 64 by another bolt and nut assembly 68, the bolt and nut assembly 68 extending through a slot in each of the mounting elements 62,64. Integrally formed to said second mounting element 64 is an elongated flexible cable 72 that extends therefrom along the rearward facing side 55 of the L-shaped transverse support 54, around a pulley 74 pivotally connected about a bolt and nut assembly 76. The cable 72 continues around the pulley 74 to where the opposite end connects to the front mounting plate 48. Referring back to the pulley 74, it is noted from FIG. 4 that the pulley is rotatably mounted on a generally U-shaped bracket 80 which is fixed to the back side of the L-shaped transverse support 54. Also it is further noted at this point, that the cable 72 can be tensioned by adjusting the overlapment of the first and second mounting elements 62,64.

From FIGS. 2 and 4, it is apparent that the spring 58, first and second mounting elements 62,64, cable 72 and pulley 74 are generally disposed behind the rearmost facing side 55 of the transverse support 54. Additionally, it is seen that an U-shaped guide rail 78 is fixed to the first and second mounting elements 62,64 for guiding the elements along the inside portion of the rear facing side 55 of the transverse support member 54.

To appraise the operator stationed in the operator's station of the relative angular position of the front pivotally mounted bucket, an indicator 70 is fixed to the first mounting element 62 and extends through the elongated slot 56 to appear about the rear face 55 of the transverse member 54. In the particular disclosure of the present application, the indicator 70 is of a general triangular shape and is adapted to move laterally back and forth as the cable 72 and spring 58 cooperatively coact as the bucket 40 is pivoted about transverse axis 42.

It is apparent, as shown in the present disclosure, that the rear face 55 of transverse member 54 may be provided with certain forms of indicia such as "carry", "dump" and "level" to appraise the operator of the precise angular disposition of the front pivotally mounted bucket 40. Also subdivision marks or graduations may be provided between these marked positions to indicate the precise angle of the cutting edge of the bucket 40 during intermediate bucket positions.

One particular advantage of the bucket level indicator of the present disclosure is realized in the digging and excavating of earth and raising it to an upper position for depositing in a truck or similar transport device. During this operation the operator can adjust the bucket to the desired level as the boom structure is being lowered from the dumping position to a ground engaging excavating position. It is noted that the transverse support member 54 passes directly in front of the operator station as the boom arms 32 are being lowered. Therefore, the operator has in his view the indicator 70 as the boom is being oscillated back and forth. Thus, the operator can manipulate the controls to the hydraulic cylinders 44 during the transition from dumping to excavating and once the bucket is at ground level he is ready to proceed without having to adjust the level of the bucket at that time. Therefore, the present bucket level indicator greatly increases the efficiency of the operator as it is in a clearly visible location and lends itself to appraising the operator of the bucket level position during the transitional periods of operation, thereby enabling the operator to position the bucket during the most desireable times of operation. In this same regard, it will be noted that for a given set of conditions, the operator can position the cutting edge of the bucket at such an angle to utilize the maximum power of the loader during digging. Here again the bucket level indicator of the present invention may be used to indicate to the operator the maximum earth cutting angle for the particular set of earth and soil conditions being presented, thereby lending itself in another way to increasing the overall efficiency of the operator.

The terms, "upper," "lower," "forward," "rearward" etc. have been used herein merely for the convenience of the foregoing specification and in the appended claims to describe the bucket level indicator and its parts as oriented in the drawings. It is to be understood, however, that these terms are in no way limiting to the invention since the retriever attachment may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. A bucket position indicator for a front end loader, comprising in combination: a powered wheel supported body structure having an operator station formed therein; a pair of laterally spaced generally forwardly extending boom arms carried by said body structure and moveable relative thereto between upper and lower positions; a bucket pivotally mounted about a transverse axis to a forward portion of said boom arms; means interconnected between said bucket and said boom structure for selectively pivoting said bucket about a working angle; a support structure transversely mounted between said boom arms and spaced forwardly therein relative to said operator's station so as to pass before an operator stationed therein as said boom arms are moved between said upper and lower positions; an indicator fixed to a mounting member and disposed generally along a rear side of said transverse support facing said operator's station; a tension spring anchored to one side of said transverse support and fixed to one end of said mounting member; and a cable moveably responsive to the pivoting of said bucket about said transverse axis and connected to the other end of said mounting member, said cable and coil spring coacting to move said indicator laterally back and forth along the rear side of said transverse support member between extreme positions thereon as said bucket is pivoted through its working angle.

2. A bucket position indicator, as recited in claim 1, wherein said transverse support member is of a general L-shape with one side particularly disposed so as to generally face said operator station, and wherein said last mentioned side includes a transversely extending elongated slot wherein said indicator extends therethrough and is visible to an operator stationed in said operator's station, while said mounting member, spring and cable are generally disposed behind said side facing towards said operator's station.

3. A position indicator for a front end loader, as recited in claim 1, wherein said mounting member includes slotted first and second sections interconnected by a bolt assembly, said slotted sections and bolt assembly allowing for adjustment of said indicator to reflect the angular position of said bucket about its axis along a selected segment of said transverse support.

4. A bucket position indicator for a front end loader, as recited in claim 1, wherein said boom arms are provided with a mounting plate for mounting various types of material handling attachments thereto, and wherein said cable fixed to one end of said mounting member is fixed about the other end to said mounting plate.

5. A bucket position indicator for a front end loader, as recited in claim 1, wherein an intermediate portion of said cable is trained around a pulley pivotally mounted to the side of said transverse support structure opposite said tension spring.

6. A material handling implement position indicator for a front end loader, comprising in combination: a wheel supported body structure having an operator's station formed therein; a boom structure carried by said body and including a pair of laterally spaced generally forwardly extending boom arms moveable up and down between upper and lower positions; a material handling implement pivotally mounted about a transverse axis forwardly between said boom arms; actuating means for pivoting said material handling implement back and forth about said transverse axis through an angle, said bucket normally assuming dump and carry positions at extreme positions within said angle while assuming a level position intermediate said extreme positions; a support member transversely mounted between said boom arms and spaced forwardly therein relative to said operator's station so as to pass before said operator's station as said boom structure is moved between said upper and lower positions; an indicator moveably mounted adjacent said transverse support member; spring means fixed to one side of said transverse support member and connected to said indicator for normally biasing said indicator toward said one side; and a cable having one end fixed to said indicator and extending therefrom along the other side of said transverse member opposite said spring means, the other end of said cable being operatively responsive to the pivotable movement of said material handling implement such that said cable acts to pull said indicator along said transverse support member away from said spring during the pivotal movement of said material handling implement from one extreme position to another, and wherein said spring acts to pull the indicator back to said one side as said material handling implement is pivoted from said other extreme position to the one extreme position, thereby indicating to the operator the relative position of the material handling implement at any time during the movement between the two extreme positions.

7. A material handling implement position indicator, as recited in claim 6, wherein said transverse support member includes an elongated slot transversely formed therein, and wherein said indicator is confined therein for lateral back and forth movement.

8. A material handling implement position indicator, as recited in claim 7, wherein said transverse support member includes a side portion facing said operator's station and wherein said elongated slot is formed therein.

9. A material handling implement position indicator, as recited in claim 6, wherein said indicator is mounted to a mounting member, and wherein said mounting member includes first and second adjustably connected section members, whereby the position of said indicator may be varied along said transverse support member to reflect a certain angular position of said material handling implement.

10. A material handling implement position indicator, as recited in claim 9, wherein said transverse support member includes a side portion facing said operator's station with an elongated slot formed therein, and wherein said indicator is confined within said slot and moveable laterally back and forth as said material handling implement is pivoted about its axis of rotation.

11. A material handling implement position indicator, as recited in claim 10, wherein said first and second section members are disposed generally behind said side portion facing said operator and wherein said indicator extends through said elongated slot and is visible to an operator stationed in said operator's station.

* * * * *